United States Patent Office 3,006,910
Patented Oct. 31, 1961

3,006,910
CATALYTIC POLYMERIZATION OF MONO-OLEFINS

Ervin G. Pritchett, Silverton, and James R. Gibbs, Cincinnati, Ohio, assignors to National Distillers and Chemical Corporation, New York, N.Y., a corporation of Virginia
No Drawing. Filed Aug. 15, 1958, Ser. No. 755,125
5 Claims. (Cl. 260—94.9)

This invention relates to a process for polymerizing an olefinic hydrocarbon in the presence of a combination catalyst system and, more particularly, to polymerization of an aliphatic monoolefin in the presence of a combination catalyst system and an activator for initiating the polymerization reaction with said system.

The present invention is based on the discovery that, in a polymerization process for an olefinic hydrocarbon using a combination catalyst of an organotin compound and a metal compound as defined more fully hereinafter, an unexpected improvement for initiating the reaction and obtaining high yields of polymer can be obtained if the polymerization is initiated in the presence of a defined small amount of water based on the amount of the tin-containing component of the combination catalyst. In addition, the molecular weight of the polymer can be controlled by variation of the water content.

In practice of this invention, the tin-containing component is preferably a hydrocarbon derivative of tin including aryl-, alkyl-, and cycloalkyl-tin compounds, with specific examples thereof being substances such as tetraphenyl tin, tetraethyl tin, tetramethyl tin, tetraisopropyl tin, tetravinyl tin, hexaphenyl-distannoxane and hexaethyl distannoxane, as well as mixed alkyls and aryls of tin-tin oxides. As the other component, there can be used a derivative of a group IV$b$ metal, and particularly a halide thereof, from the group consisting of titanium, zirconium, hafnium and thorium. Although the chlorides of such metals are preferred, and particularly titanium-tetrachloride and -trichloride, other halides such as the bromides, iodides and fluorides may be used with specific illustrations thereof being zirconium tetrabromide, titanium tetraiodide, zirconium dibromide, hafnium triiodide, thorium tetrabromide, etc. Still other derivatives of such metals include those corresponding to a tetrahalide thereof in which from one to four of the halide atoms is replaced with an OR group in which R is a hydrocarbon group. Illustrative thereof are compounds such as butoxy titanium trichloride, ethoxy butoxy titanium dichloride, ethoxy dibutoxy titanium chloride, dibutoxy zirconium dichloride, triethoxy zirconium bromide, etc.

The total quantity of the combination catalyst that may be used can be varied within a wide range but, generally, within the range of from about 0.01 to about one percent or more, based on the weight of the olefin subjected to polymerization. The proportional amounts of the components of the combination catalyst can also be varied over a wide range and, preferably between 0.5 to 2 moles of the tin compound per mole of the stated group IV$b$ metal component.

The compounds which may be polymerized according to the present invention consist, generally, of polymerizable aliphatic olefins or mixtures thereof such as the monoolefins containing from 2 to 6 carbon atoms. Specific examples of such polymerizable hydrocarbons include ethylene, propylene, butene-1, pentene-1, hexene-1, 4-methyl-pentene-1, butadiene isoprene, etc.

For effecting the desired polymerization of the polymerizable hydrocarbon, a temperature within the range of about 100 to about 300° C. is generally employed but, preferably, from about 150 to 250° C. As to pressure, the polymerization may be effected at substantially atmospheric but, preferably an elevated pressure of from about 100 to about 1000 p.s.i.g. is used.

The polymerization reaction is carried out either in batch, semi-continuous, or continuous operations. Most conveniently, and in the preferred embodiments, the process is carried out in a diluent or liquid reaction medium, the amount not being unduly critical, but it should be at least sufficient to permit effective agitation and, preferably, to hold the major portion of the polymer in suspension. Organic solvents and/or diluents of the organic hydrocarbon class such as petroleum ether, pentane, cyclopentane, the hexanes, cyclohexanes, heptane, mineral spirits, and mixtures of these materials can be used. It is preferred that the material used be essentially free of impurities which may react to destroy catalyst activity or which copolymerize with the olefin. That is, appreciable quantities of materials such as alcohols and unsaturates should be preferably absent. Thus, the diluents should essentially consist of one or more inert saturated hydrocarbons, that is, hydrocarbons devoid of olefinic unsaturation.

For this improved process, the polymerizable hydrocarbon may be used in substantially pure form or there may be used a mixture containing major quantities thereof, provided no impurities are present in amounts which will destroy the catalyst and/or contaminate the polymer products. For instance, ethylene obtained by the cracking of hydrocarbon streams is satisfactory if acetylenic materials are not present in more than trace amounts.

In carrying out the herein described polymerization process, it is preferably and highly desirable to maintain the polymerization zone free of extraneous reactive gases. This can be done by keeping the reactor blanketed at all times with an inert gas, for instance, operating with an inert gas such as nitrogen, argon or helium. Preferably, the reactor and its contents are blanketed with the polymerizable substance (e.g., ethylene gas) to avoid unnecessary dilution of the reactor contents with inert gases.

In accordance with this invention, the polymerization reaction is initiated in the presence of water in a small amount, such as in the range of from about 2 to about 200, and preferably from about 4 to about 100 millimoles of water per mole of the tin-containing component of the catalyst. By such presence of water, it has been found that the polymerization reaction is markedly improved with respect to initiation of the defined catalytic reaction using the aforesaid combination catalyst with the water serving, in presently unkown manner, as an initiator for such a polymerization reaction.

In order to further describe the invention, there is set forth in the following tabulation, data illustrating the effect of controlled amounts of water on yield and molecular weight. For each run, there is shown the amount of water present in the ethylene feed used for each run with remarks that set forth, in applicable runs, the amount of additional water added either to the ethylene feed or to the liquid reaction medium. The following reaction conditions were used in each run.

Four and six tenths g. (0.0108 mol) of tetraphenyltin and 1.73 g. (0.009 mol) of titanium tetrachloride were mixed in 400 ml. of purified hydrocarbon solvent (n-heptane or decalin) under an atmosphere of nitrogen or argon. The mixture was sealed in a stirred, one-liter autoclave at 20–60° C., the autoclave swept with ethylene to displace inert gas, and ethylene was then introduced to a pressure of about 200 p.s.i.g. The autoclave was heated, rapidly at first and more slowly as reaction began. The onset of ethylene polymerization was indicated by a drop in pressure within the autoclave, and, thereafter, ethylene was added to maintain the pressure at 400 to 500 p.s.i.g. Polymerization began at 100 to 160° C. and continued to completion at 180 to 270° C. When ethylene was no longer consumed, the autoclave was cooled and the product was removed, washed with methanol to effect catalyst removal, dried at 80° C. under reduced pressure, and weighed.

TABLE I

*Organotin-titanium tetrachloride catalyzed polymerization of ethylene*

EFFECT OF ETHYLENE MOISTURE CONTENT ON POLYMER YIELD

| Run No. | $H_2O$ content of $C_2H_4$ (p.p.m. by volume) | $H_2O$ added with initial charge to reactor [1] | | Polyethylene | |
|---|---|---|---|---|---|
| | | Mg. | Mmole/mole of tetraphenyl tin | Yield, g. | Mol. weight |
| 1 | 25 | 0.189 | 0.972 | Trace | |
| 2 | 57 | 0.431 | 2.22 | 7.3 | 35,400 |
| 3 | 87 | 0.658 | 3.38 | 12.7 | 34,000 |
| 4 | 129 | 0.975 | 5.01 | 18.9 | 116,500 |
| 8 | 1,000 | 8.05 | 41.4 | 20.4 | 123,250 |

[1] Discounting solubility of ethylene in hydrocarbon at 100° C. and 300 to 400 p.s.i.g.

TABLE II

*Organotin-titanium tetrachloride catalyzed polymerization of ethylene*

EFFECT OF WATER ADDED TO INITIAL ETHYLENE CHARGE ON POLYMER YIELD

| Run No. | $H_2O$ content of $C_2H_4$ (p.p.m. by volume) | $H_2O$ added with initial charge to reactor [1] | | Polyethylene yield, g. |
|---|---|---|---|---|
| | | Mg. | Mmole/mole of tetraphenyl tin | |
| 1 | 25 | 0.189 | 0.972 | Trace |
| 5 [2] | 25 | 0.784 | 4.03 | 18.4 |
| 6 [2] | 25 | 1.44 | 7.39 | 31.7 |
| 7 [2] | 25 | 2.86 | 14.7 | 30.6 |

[1] Discounting solubility of ethylene in hydrocarbon at 100° C. and 300 to 400 p.s.i.g.
[2] Measured quantity of water-saturated ethylene added with initial charge only.

TABLE III

*Organotin-titanium tetrachloride catalyzed polymerization of ethylene*

EFFECT OF WATER ADDED TO SOLVENT ON POLYMER YIELD

| Run No. | $H_2O$ content of $C_2H_4$ (p.p.m. by volume) | $H_2O$ added with initial charge to reactor [1] | | Polyethylene | |
|---|---|---|---|---|---|
| | | Mg. | Mmole/mole of tetraphenyl tin | Yield, g. | Mol. weight |
| 2 | 57 | 0.431 | 2.22 | 7.3 | 35,400 |
| 8 | 1,000 | 8.05 | 41.4 | 20.4 | 123,250 |
| 9 [2] | 57 | 5.62 | 28.9 | 17.0 | 97,325 |
| 10 [2] | 57 | 10.7 | 55.1 | 17.2 | 72,375 |
| 11 [2] | 57 | 21.0 | 108.0 | 14.0 | 71,125 |

[1] Discounting solubility of ethylene in hydrocarbon at 100° C. and 300 to 400 p.s.i.g.
[2] Measured quantity of water-saturated solvent added prior to catalyst entry included.

As is apparent from the data in the foregoing tabulations, and as compared to the results shown from run No. 1 (Tables I and II), in which water was present in an amount less than embodied for practice of this invention, the remaining runs clearly show that when water is present in polymerizing the olefin, with the hereinbefore described catalyst system, markedly increased yields of the polymer are obtained.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a catalytic process for polymerizing a monoolefinic aliphatic hydrocarbon of two to six carbon atoms to a normally solid polymer in an inert liquid hydrocarbon reaction medium using as the polymerization catalyst a combination of (1) a tin hydrocarbon and (2) a group IVb metal tetrahalide, the improvement which comprises adding water to the reaction mixture, the total amount of added water being in the range of from about 2 to about 200 millimoles per mole of the tin hydrocarbon component of the catalyst, said catalyst being characterized by containing, in mole ratio, from about 0.5 to about two moles of the tin hydrocarbon per mole of the group IVb metal tetrahalide and used for said polymerization in an amount of from about 0.01 to about one percent based on the weight of the monoolefinic aliphatic hydrocarbon subjected to polymerization.

2. A process, as defined in claim 1, wherein the monoolefin is ethylene.

3. A process, as defined in claim 1, wherein the group IVb metal compound is titanium tetrachloride.

4. A process, as defined in claim 1, wherein the tin-containing component of the catalyst is tetraphenyltin.

5. In a process for catalytic polymerization of ethylene at from about 100 to about 300° C. in an inert liquid hydrocarbon reaction medium with about 0.01 to about one percent, based on the weight of the ethylene, of a polymerization catalyst comprising tetraphenyltin and titanium tetrachloride in a ratio of about 0.5 to 2 moles of tetraphenyltin per mole of titanium tetrachloride, the improvement which comprises adding water to the reaction mixture, the total amount of added water being in the range of from about 2 to about 200 millimoles per mole of tetraphenyltin.

References Cited in the file of this patent

UNITED STATES PATENTS 2,908,671    Hochgraf    Oct. 13, 1959

FOREIGN PATENTS 1,134,740    France    Dec. 3, 1956
778,639    Great Britain    July 10, 1957
1,022,382    Germany    Jan. 9, 1958